(12) United States Patent  
Shimizu (10) Patent No.: US 11,565,578 B2  
(45) Date of Patent: Jan. 31, 2023

(54) VEHICLE FRONT PORTION STRUCTURE

(71) Applicant: Toyota Jidosha Kabushiki Kaisha, Toyota (JP)

(72) Inventor: Kazuki Shimizu, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 416 days.

(21) Appl. No.: 16/665,528

(22) Filed: Oct. 28, 2019

(65) Prior Publication Data

US 2020/0130495 A1    Apr. 30, 2020

(30) Foreign Application Priority Data

Oct. 30, 2018    (JP) .............................. JP2018-203761

(51) Int. Cl.
| | |
|---|---|
| *B60K 1/04* | (2019.01) |
| *B62D 21/15* | (2006.01) |
| *B62D 27/02* | (2006.01) |
| *B62D 25/20* | (2006.01) |

(52) U.S. Cl.
CPC .............. *B60K 1/04* (2013.01); *B62D 21/152* (2013.01); *B62D 25/2036* (2013.01); *B62D 27/023* (2013.01); *B60K 2001/0438* (2013.01)

(58) Field of Classification Search
CPC ............ B60K 1/04; B60K 2001/0438; B62D 21/152; B62D 25/2036; B62D 27/023; B62D 27/00

See application file for complete search history.

(56) References Cited

U.S. PATENT DOCUMENTS

| | | | | |
|---|---|---|---|---|
| 6,296,300 | B1 * | 10/2001 | Sato ..................... | B62D 29/008 296/203.02 |
| 2003/0085591 | A1 * | 5/2003 | Seksaria ................. | B60R 19/03 296/193.04 |
| 2012/0097466 | A1 * | 4/2012 | Usami ..................... | B60K 1/04 180/68.5 |
| 2013/0206496 | A1 | 8/2013 | Hashimoto | |
| 2016/0039462 | A1 | 2/2016 | Kempf | |

(Continued)

FOREIGN PATENT DOCUMENTS

| | | |
|---|---|---|
| CN | 105189256 A | 12/2015 |
| CN | 110816667 A | 2/2020 |

(Continued)

*Primary Examiner* — James A Shriver, II  
*Assistant Examiner* — Michael T. Walsh  
(74) *Attorney, Agent, or Firm* — Dinsmore & Shohl LLP (57) ABSTRACT

A vehicle front portion structure includes: a battery case that is installed beneath a floor of a vehicle; front side members that extend in a vehicle longitudinal direction further toward a vehicle front side than the battery case; side rails that structure portions of a suspension member that is disposed further toward the vehicle front side, and that extend in the vehicle longitudinal direction; first connecting members that connect the battery case and the front side members; and second connecting members that connect a vehicle longitudinal direction front end portion of the battery case and vehicle longitudinal direction rear ends of the side rails, that face the battery case in the vehicle longitudinal direction as seen in a plan view and in a side view, and that face the side rails in the vehicle longitudinal direction as seen in a plan view and in a side view.

9 Claims, 6 Drawing Sheets

(56) References Cited

U.S. PATENT DOCUMENTS

| | | | | |
|---|---|---|---|---|
| 2017/0291643 A1* | 10/2017 | Sakamoto | ............... | B60L 50/51 |
| 2018/0001933 A1* | 1/2018 | Piermarioli | ............ | B62D 25/08 |
| 2018/0272852 A1* | 9/2018 | Ajisaka | .................... | B60K 1/04 |
| 2018/0312198 A1 | 11/2018 | Shimizu | | |
| 2020/0047811 A1 | 2/2020 | Shimizu | | |
| 2021/0031837 A1* | 2/2021 | Schmidt | ................. | B62D 25/00 |

FOREIGN PATENT DOCUMENTS

| | | | | |
|---|---|---|---|---|
| CN | 110861711 A | | 3/2020 | |
| DE | 19600933 A1 * | | 7/1997 | ............ B60R 19/34 |
| DE | 102013004306 A1 | | 9/2014 | |
| JP | 2011-111141 A | | 6/2011 | |
| JP | 2016002964 A * | | 1/2016 | ............ B60R 19/34 |
| JP | 2017-197018 A | | 11/2017 | |
| JP | 2018-140729 A | | 9/2018 | |
| JP | 2018140729 A * | | 9/2018 | |
| JP | 2018-187978 A | | 11/2018 | |

* cited by examiner

VEHICLE FRONT PORTION STRUCTURE

CROSS-REFERENCE TO RELATED APPLICATION

This application claims priority under 35 USC 119 from Japanese Patent Application No. 2018-203761 filed on Oct. 30, 2018, the disclosure of which is incorporated by reference herein.

BACKGROUND

Technical Field

The present disclosure relates to a vehicle front portion structure.

Related Art

Japanese Patent Application Laid-Open (JP-A) No. 2017-197018 discloses a vehicle front portion structure having a battery case that covers the outer periphery of a battery that is disposed beneath the floor of a vehicle, a suspension member that is disposed at the vehicle front side of the battery case, and brackets that are shaped as flat plates and connect the vehicle front end portion of the battery case and the rear end portion of the suspension member.

In JP-A No. 2017-197018, at the time of a front collision of the vehicle, collision load is transmitted from the suspension member via the brackets to the battery case. Accordingly, the impact resistance of the vehicle at the time of a front collision may be improved, and the amount of deformation of the vehicle is reduced.

However, in the vehicle lower portion structure disclosed in JP-A No. 2017-197018, the lower surface of the battery case and the lower surface of the suspension member are connected by the brackets that are shaped as flat plates. Accordingly, the component of force in the vehicle longitudinal direction at the time of a front collision cannot be transmitted from the rear end surface that is formed substantially perpendicular to the vehicle longitudinal direction at the rear end of the suspension member, to the front end surface that is formed substantially perpendicular to the vehicle longitudinal direction at the front end of the battery case. Therefore, there is the concern that the transmitting of collision load to the battery case will be suppressed.

SUMMARY

The present disclosure provides a vehicle front portion structure that efficiently transmits load, which is inputted to a suspension member at the time of a front collision of a vehicle, to a battery case.

A first aspect of the present disclosure is a vehicle front portion structure including: a battery case that is installed beneath a floor of a vehicle; front side members that extend in a vehicle longitudinal direction further toward a vehicle front side than the battery case; side rails that structure portions of a suspension member that is disposed further toward the vehicle front side than the battery case, and that extend in the vehicle longitudinal direction; first connecting members that connect the battery case and the front side members; and second connecting members that connect a vehicle longitudinal direction front end portion of the battery case and vehicle longitudinal direction rear ends of the side rails, that face the battery case in the vehicle longitudinal direction as seen in a plan view and in a side view, and that face the side rails in the vehicle longitudinal direction as seen in a plan view and in a side view.

The vehicle front portion structure of the first aspect has the second connecting members connect the battery case and the side rails. Further, the second connecting members face the side rail rear end surfaces and the battery case front end surface in the vehicle longitudinal direction. Accordingly, at the time of a front collision of the vehicle, load transmission from the rear end surfaces of the suspension member via the second connecting members to the front end surface of the battery case is carried out.

Further, the first connecting members connect the battery case and the front side members. Accordingly, the load that is inputted to the front side members at the time of a front collision is transmitted to the battery case via the first connecting members.

In a second aspect of the present disclosure, in the first aspect, vehicle longitudinal direction rear ends of the front side members and the vehicle longitudinal direction rear ends of the side rails may be offset in a vehicle transverse direction.

The vehicle front portion structure of the second aspect, the vehicle longitudinal direction rear ends of the front side members and the vehicle longitudinal direction rear ends of the side rails are apart from one another in the vehicle transverse direction. Accordingly, at the battery case, the places where load is inputted at the time of a front collision may be distributed.

In a third aspect of the present disclosure, in the first aspect or the second aspect, vehicle longitudinal direction front end portions of the second connecting members each have a pair of supporting portions that extend toward a vehicle front side, and rear end portions of the side rails are supported by the supporting portions.

The vehicle front portion structure of the third aspect, because the side rail rear end portions are inserted in the supporting portions of the second connecting members, positional offset of the side rails and the second connecting members is suppressed.

In a fourth aspect of the present disclosure, in the third aspect, the supporting portions support vehicle transverse direction side surfaces of the side rails, and the side rails and the supporting portions are fastened by fastening members that are inserted from vehicle transverse direction outer sides.

The vehicle front portion structure of the fourth aspect, the supporting portions of the second connecting members and the side rails are fastened from the vehicle transverse direction outer sides. Accordingly, at the time of assembling or disassembling the side rails and the battery case, work may be carried out from the vehicle transverse direction outer sides.

In a fifth aspect of the present disclosure, in the third aspect or the fourth aspect, each of the second connecting members includes: a pair of transmitting portions that extend in the vehicle longitudinal direction from respective rear ends of the pair of supporting portions; a rear wall portion that connects rear ends of the pair of transmitting portions in a vehicle transverse direction; a first rib that connects the pair of transmitting portions at a vehicle longitudinal direction front side of the rear wall portion; a second rib that connects the rear wall portion and a first joining portion that joins the first rib and one transmitting portion of the pair of transmitting portions; and a third rib that connects a rear, end of the second rib and a second joining portion that joins the first rib and another transmitting portion of the pair of transmitting portions, wherein a third joining portion, which joins the second rib and the third rib, overlaps with a rear end of a corresponding side rail in a vehicle vertical direction.

The vehicle front portion structure of the fifth aspect, the second connecting member includes the transmitting portions, the first rib, the second rib, and the third rib. Accordingly, the second connecting member is a light-weight and highly rigid structure. Further, because the third joining portions overlap with the rear ends of the side rails in the vehicle vertical direction, the load that is inputted to the side rails at the time of a front collision may be transmitted to the battery case via the transmitting portions, the first ribs, the second ribs, and the third ribs.

In a sixth aspect of the present disclosure, in the fifth aspect, the battery case has corner portions at a vehicle longitudinal direction front end portion as seen in a vehicle plan view, and each third joining portion faces a corresponding corner portion in the vehicle longitudinal direction.

The vehicle front portion structure of the sixth aspect, load may be received at the corner portions of the battery case, and load may be dispersed in the vehicle longitudinal direction and the vehicle transverse direction of the battery case.

In a seventh aspect of the present disclosure, in any one of the first aspect through the sixth aspect, heights of centroids of the side rails in a vehicle vertical direction coincide with a height of a centroid of the battery case in the vehicle vertical direction.

In accordance with the vehicle front portion structure relating to the seventh aspect, load may be transmitted at the centroids of the side rails and the battery case at the time of a front collision, and the suspension member may efficiently receive reaction force from the battery case.

In accordance with the vehicle front portion structure relating to the first aspect, at the time of a front collision, load that is inputted to the suspension member may be transmitted efficiently to the battery case, and therefore, the impact resistance of the vehicle may be improved.

In accordance with the vehicle front portion structure relating to the second aspect, due to the places where load is inputted to the battery case being distributed, damage to the battery case may be suppressed.

In accordance with the vehicle front portion structure relating to the third aspect, at the time of a front collision, load that is inputted to the suspension member may be transmitted to the battery case more efficiently. Therefore, the impact resistance of the vehicle may be improved more.

In accordance with the vehicle front portion structure relating to the fourth aspect, at the time of assembling or disassembling the side rails and the battery case, the workability may be improved.

In accordance with the vehicle front portion structure relating to the fifth aspect, lightening, of the weight of and increasing of the rigidity of the second connecting member may both be achieved. Further, at the time of a front collision, load that is inputted to the suspension member may be transmitted to the battery case more efficiently, and therefore, the impact resistance of the vehicle may be improved more.

In accordance with the vehicle front portion structure relating to the sixth aspect, because load that is inputted to the battery case may be dispersed in the vehicle longitudinal direction and the vehicle transverse direction, damage to the battery case may be suppressed.

In accordance with the vehicle front portion structure relating to the seventh aspect, impact absorption is promoted due to the suspension member, which receives reaction force, being axially compressed. Therefore, the impact resistance of the vehicle may be improved even more.

BRIEF DESCRIPTION OF THE DRAWINGS

Exemplary embodiments of the present disclosure will be described in detail based on the following figures, wherein.

DETAILED DESCRIPTION

Vehicle front portion structures relating to embodiments of the present disclosure are described with reference to FIG. 1 through FIG. 6. Note that the vehicle vertical direction upper side is denoted by arrow UP, the vehicle longitudinal direction front side is denoted by arrow FR, the vehicle right side in the vehicle transverse direction is denoted by arrow RH, and the vehicle left side in the vehicle transverse direction is denoted by arrow LH. Further, when longitudinal, vertical and left-right directions are used in the following description, they refer to the longitudinal of the vehicle longitudinal direction, the vertical of the vehicle vertical direction, and the left and the right in the vehicle advancing direction, unless otherwise specified.

First Exemplary Embodiment

Figure 1:
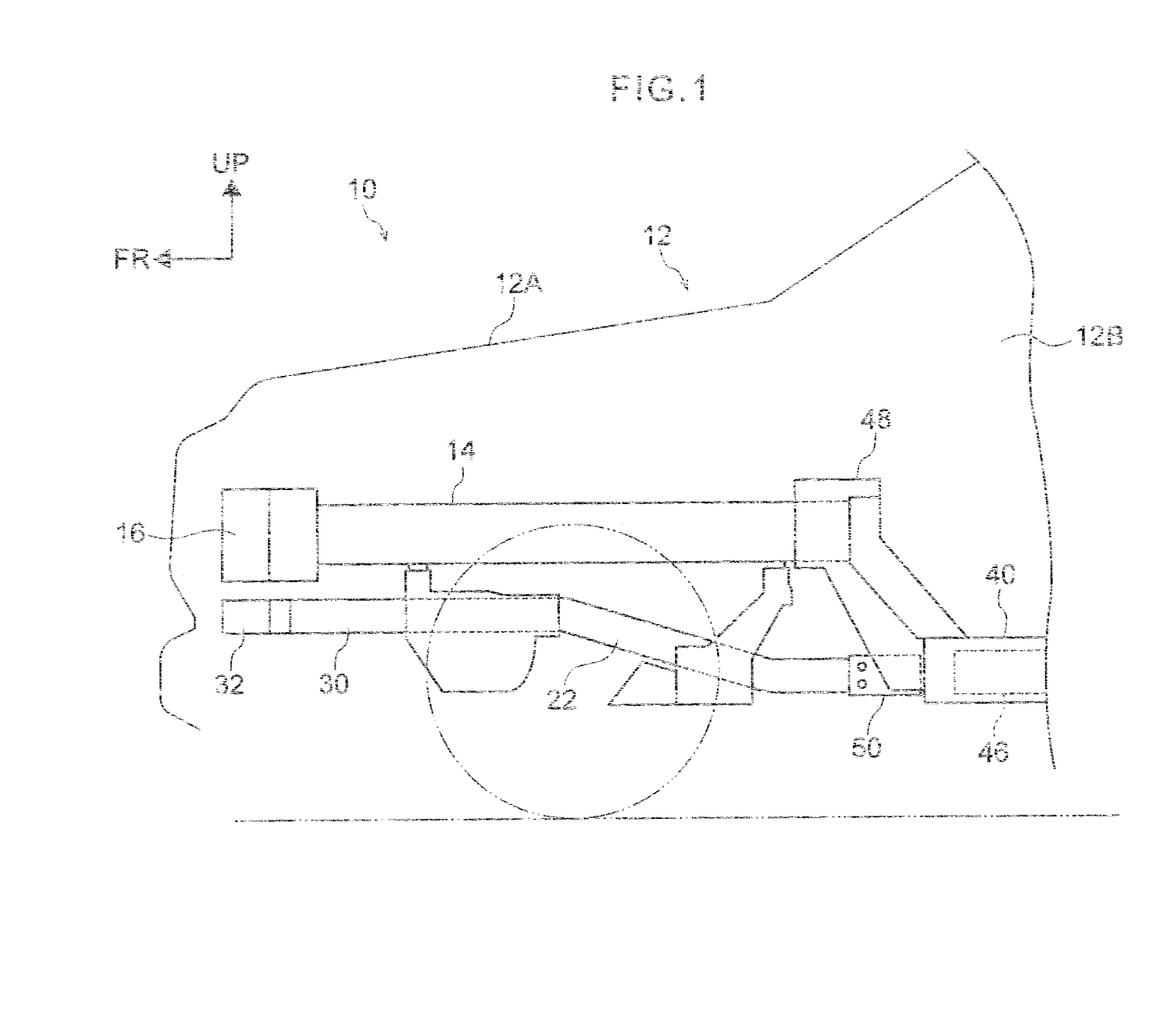
FIG. 1 is a side view illustrating an overview of the front portion of a vehicle to which a vehicle front portion structure of a first exemplary embodiment is applied.

As illustrated in FIG. 1, a vehicle front portion structure 12 relating to the present exemplary embodiment is applied to the front portion of a vehicle 10 that is an electric automobile, and has a vehicle front portion chamber 12A and a vehicle cabin 12B. The vehicle front portion chamber 12A is disposed at the vehicle front side, and various parts such as electrical components and the like are housed therein. The vehicle cabin 12B is disposed at the vehicle rear side of the vehicle front portion chamber 12A so as to be adjacent thereto. The vehicle front portion chamber 12A and the vehicle cabin 12B are partitioned by a dash panel (not illustrated).

Figure 2:
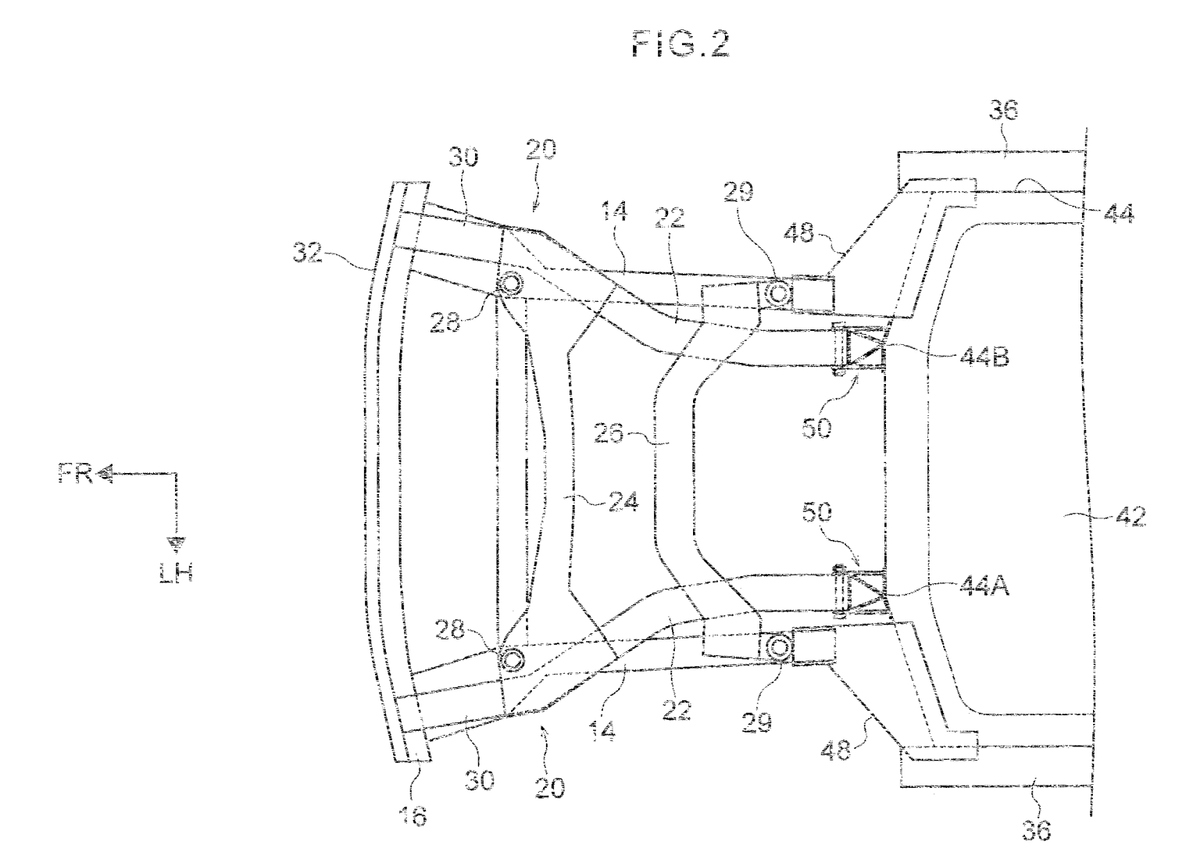
FIG. 2 is a drawing in which the vehicle front portion structure of the first exemplary embodiment is seen from the lower side.

A pair of left and right front side members 14 are disposed in the vehicle front portion chamber 12A. As illustrated in FIG. 1 and FIG. 2, the front side members 14 are vehicle frame members that have closed cross-sectional shapes and that extend in the longitudinal direction at the vehicle transverse direction both side portions of the vehicle 10.

A bumper reinforcement 16 is mounted to the longitudinal direction front ends of the front side members 14. The bumper reinforcement 16 extends in the vehicle transverse direction, and connects the front ends of the pair of front side members 14. The rear ends of the front side members 14 are connected to battery front side portions 48 that are described later.

A front suspension member 20 is disposed at the vertical direction lower sides of the front side members 14. The front suspension member 20 has a pair of left and right side rails 22, a front cross member 24, and a rear cross member 26.

As illustrated in FIG. 2, the rear ends of the side rails 22 are disposed so as to be offset further toward the vehicle transverse direction inner side than the rear ends of the front side members 14. Further, the longitudinal direction central portions of the respective side rails 22 are formed in shapes that curve gently toward the vehicle transverse direction inner side while heading toward the rear side, as seen in a plan view. A motor unit (not illustrated) is installed at the vehicle transverse direction inner side of the side rails 22.

The front end portions of the pair of side rails 22 are connected in the vehicle transverse direction by the front cross member 24. Further, the pair of side rails 22 are connected in the vehicle transverse direction by the rear cross member 26 that is disposed further toward the rear than the front cross member 24.

The vehicle transverse direction both end portions of the front cross member 24 are fastened to the side rails 22 by bolts 28 from the vehicle lower side. Further, the vehicle transverse direction both end portions of the rear cross member 26 are fastened to the side rails 22 by bolts 29 from the vehicle lower side.

Figure 3:
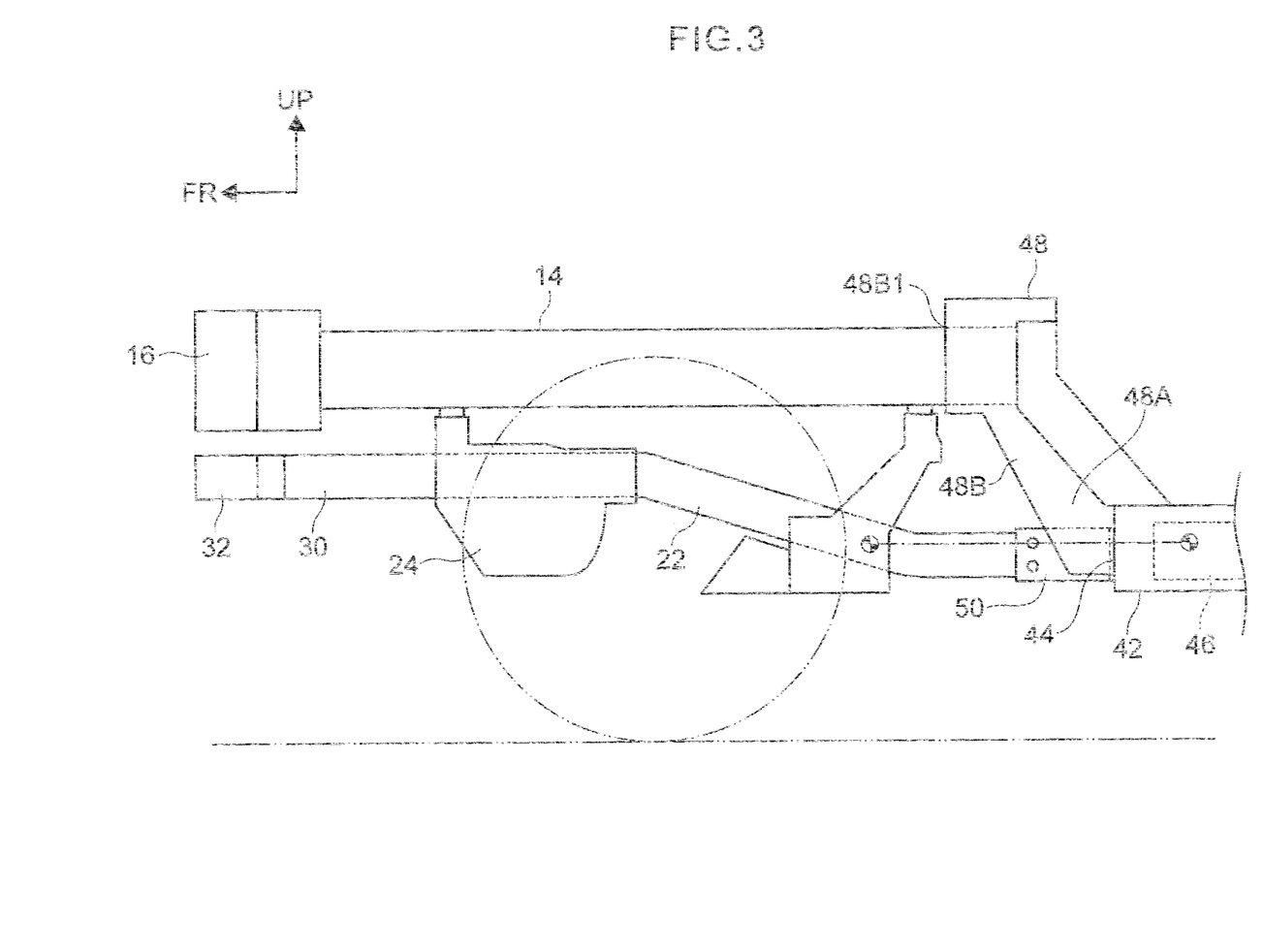
FIG. 3 is a side view of the front portion of the vehicle to which the vehicle front portion structure of the first exemplary embodiment is applied.

As illustrated in FIG. 3, the pair of side rails 22 extend in the longitudinal direction and are disposed so as to be apart from the front side members 14 in the vertical direction.

Lower side members 30 are connected to the respective front end portions of the pair of side rails 22. The lower side members 30 extend forward from the front end portions of the side rails 22.

A lower bumper reinforcement 32 is mounted to the front end portions of the lower side members 30. The lower bumper reinforcement 32 extends in the vehicle transverse direction and connects the front ends of the pair of lower side members 30. Further, the lower bumper reinforcement 32 is disposed beneath the bumper reinforcement 16.

In the present exemplary embodiment, the side rails 22 and the lower side members 30 are made of aluminum extruded materials. Further, the front cross member 24 and the rear cross member 26 are produced by aluminum die casting.

A pair of left and right rockers 36 are disposed at the regions that are at the lower side of and the vehicle transverse direction outer sides of the vehicle cabin 12B in FIG. 2. The rockers 36 are vehicle frame members that have closed cross-sectional shapes and that extend in the longitudinal direction. Note that the rockers 36 are omitted from FIG. 1 and FIG. 3 for convenience.

A battery case 40 is provided between the pair of rockers 36. The battery case 40 is disposed at the lower side of the vehicle cabin 12B, and has a bottom plate 42 and a battery frame portion 44.

The bottom plate 42 is shaped as a substantially rectangular plate, and covers the entire battery case 40 from the lower side. Further, the both side portions of the front side of the bottom plate 42 are inclined toward the rear while heading toward the vehicle transverse direction outer sides as seen in a plan view.

The battery frame portion 44 is shaped as a frame having a uniform height, and is disposed along the outer edge of the bottom plate 42. A corner portion 44A and a corner portion 44B, which are inclined toward the rear while heading toward the vehicle transverse direction outer sides as seen in plan view, are formed at the both side portions of the front end surface of the battery frame portion 44.

Note that, in the present exemplary embodiment, the vehicle left side that has the corner portion 44A is describe. Because the vehicle right side has a similar structure, description thereof is omitted.

The battery 46 is housed on the bottom plate 42 at the inner side region of the battery frame portion 44. The battery 46 is surrounded by the battery frame portion 44.

The battery front side portions 48 (first connecting members) are provided at the vehicle transverse direction both sides of the battery frame portion 44, and connect the front end of the battery frame portion 44 and the rear ends of the front side members 14. Each of the battery front side portions 48 has a bottom portion 48A whose lower surface extends forward from the battery frame portion 44 along the bottom plate 42, and an inclined portion 48B whose lower surface extends from the front end of the bottom portion 48A toward an obliquely front upper side.

The bottom portion 48A is fastened to the bottom plate 42 from the vehicle lower side by bolts (not illustrated). The rear side surface of the bottom portion 48A contacts the front end surface of the battery frame portion 44. A forward-facing surface 48B1 that faces forward is formed at the front end of the inclined portion 48B so as to stand in the vehicle vertical direction. The rear end of the front side member 14 is connected to the forward-facing surface 48B1.

Further, as illustrated in FIG. 3, the side rails 22 of the front suspension member 20 and the battery case 40 are disposed such that the heights of the respective centroids thereof are aligned in the vehicle vertical direction.

Figure 4:
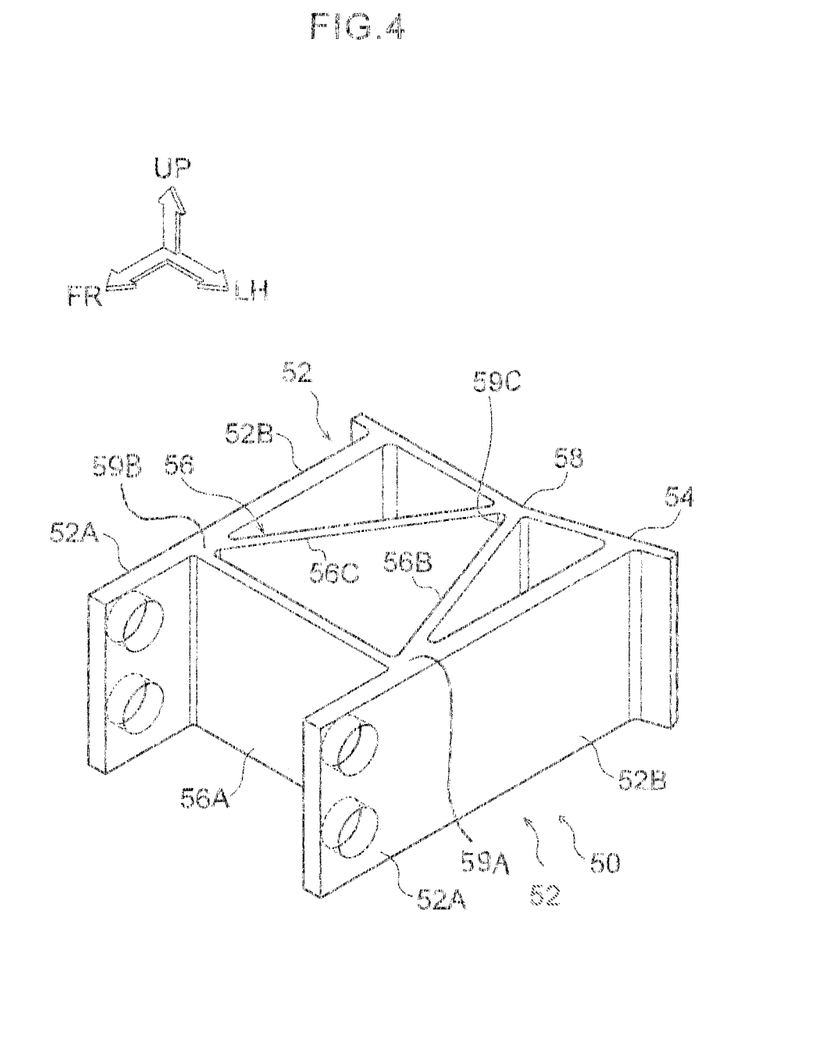
FIG. 4 is a perspective view illustrating the structure of a battery bracket in the vehicle front portion structure of the first exemplary embodiment.

The side rails 22 and the battery case 40 are connected by battery brackets 50 (second connecting members). As illustrated in FIG. 4, the battery bracket 50 is structured by side wall portions 52, a rear, wall portion 54 and a reinforcing rib 56. Further, an aluminum extruded material is used for the battery bracket 50.

The side wall portions 52 are structured by two flat-plate-shaped members that are disposed so as to be apart from one another in the vehicle transverse direction and that have surfaces that are substantially perpendicular to the vehicle transverse direction. Each of the side wall portions 52 is structured by a supporting portion 52A, and a transmitting portion 52B that extends toward the rear from the supporting portion 52A.

Two through-holes, which pass-through each of the supporting portions 52A in the vehicle transverse direction, are provided so as to be lined-up in the vehicle vertical direction. The rear end portion of the side rail 22 is inserted between the supporting portions 52A as will be described later. Further, the rear end of the side rail 22 abuts a first reinforcing rib 56A that is described later. The transmitting portions 52B extend in the vehicle longitudinal direction substantially parallel to one another, toward the vehicle rear from the respective rear ends of the supporting portions 52A.

The rear wall portion 54 is a plate-shaped member that connects the respective rear ends of the transmitting portions 52B and extends in the vehicle transverse direction. The rear wall portion 54 extends further toward the vehicle transverse direction outer sides than the respective transmitting portions 52B, and, at the vehicle transverse direction central portion thereof, has a bending point 58 that is concave toward the vehicle front side as seen in a plan view.

The reinforcing rib 56 is disposed between the respective side wall portions 52, at the vehicle front side of the rear wall portion 54. The reinforcing rib 56 is structured by the first reinforcing rib 56A, a second reinforcing rib 56B and a third reinforcing rib 56C that are respectively shaped as flat plates.

The first reinforcing rib 56A has a surface that is substantially perpendicular to the vehicle longitudinal direction. The vehicle transverse direction both ends of the first reinforcing rib 56A are joined to the transmitting portions 52B by a first joining portion 59A and a second joining portion 59B.

The second reinforcing rib 56B and the third reinforcing rib 56C are respectively inclined toward the vehicle transverse direction inner side of the battery bracket 50 while heading toward the rear. The second reinforcing rib 56B connects the first joining, portion 59A and the rear wall portion 54, and the third reinforcing rib 56C connects the second joining portion 59B and the rear wall portion 54. The respective rear ends of the second reinforcing rib 56B and the third reinforcing rib 56C are joined by a third joining portion 59C. The side wall portions 52, the rear wall portion 54 and the reinforcing rib 56 of the battery bracket 50 form a truss that is structured from three triangles as seen in a plan view.

Figure 5:
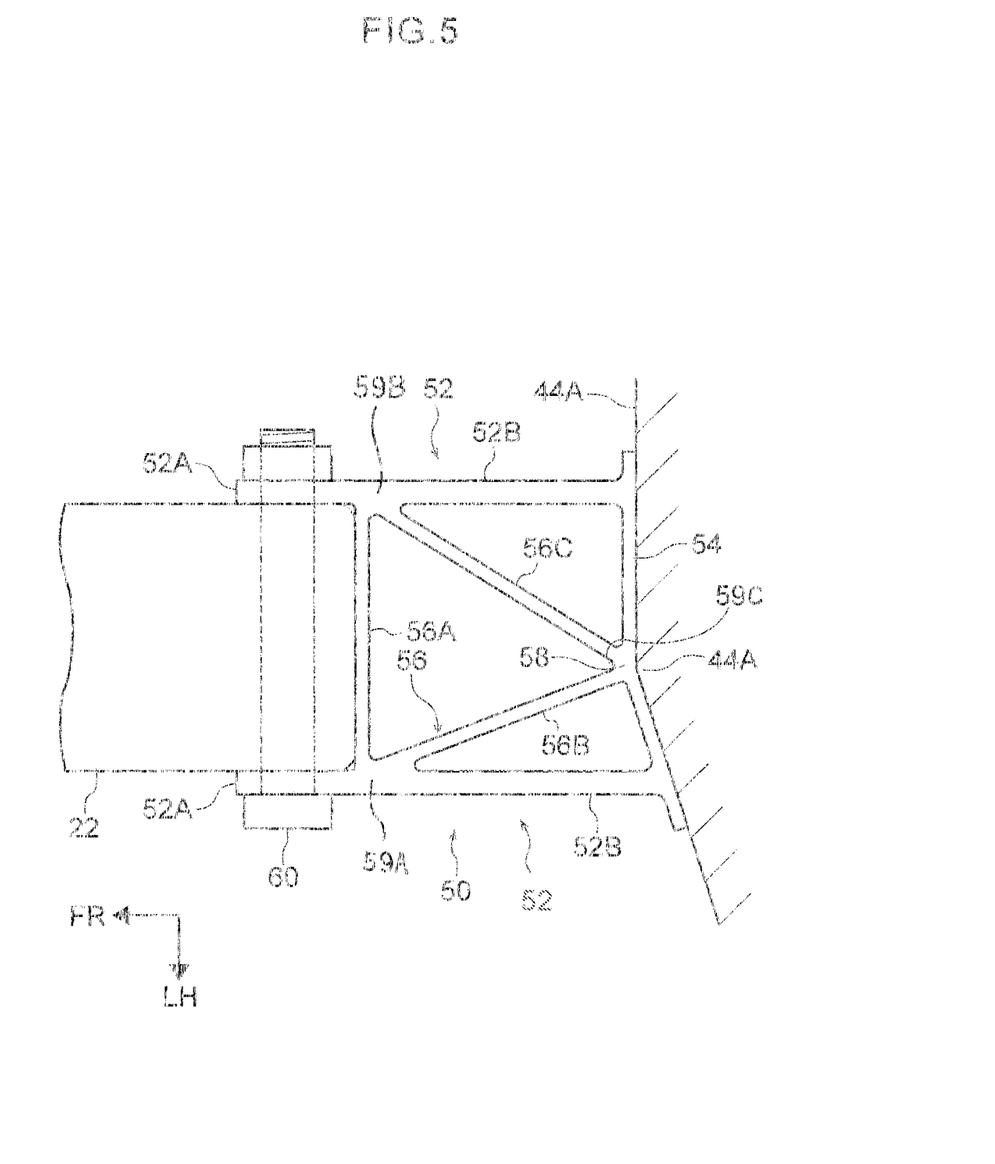
FIG. 5 is a plan view of the periphery of the battery bracket in the vehicle front portion structure of the first exemplary embodiment.

The structure of the portion where the side rail 22 and the battery case 40 are connected via the battery bracket 50 is described next. As illustrated in FIG. 5, the rear end portion of the side rail 22 is inserted between the respective supporting portions 52A of the battery bracket 50, and the rear end of the side rail 22 abuts the first reinforcing rib 56A. Further, the supporting portions 52A and the rear end portion of the side rail 22 are fastened together by a bolt 60, which is inserted in from the vehicle transverse direction outer side, and a nut (not illustrated).

The side rail 22 and the first reinforcing rib 56A are disposed so as to face one another in the longitudinal direction. The third joining portion 59C is disposed so as to overlap the side rail 22 in the vehicle transverse direction and the vertical direction.

The rear wall portion 54 abuts the front send surface of the battery frame portion 44, and the bending point 58 contacts the corner portion 44A. The vehicle transverse direction both end portions of the rear wall portion 54 are welded by arc welding to the front end surface of the battery frame portion 44.

Operation of the first exemplary embodiment is described next. In a case in which the vehicle 10 is involved in a front collision with an obstacle or the like, first, collision load, is inputted from the vehicle front to the bumper reinforcement 16 and the lower bumper reinforcement 32.

The collision load is transmitted via the bumper reinforcement 16 and the front side members 14 to the battery front side portions 48. Further, the collision load is transmitted via the lower bumper reinforcement 32, the lower side members 30 and the side rails 22 to the battery brackets 50.

In the present exemplary embodiment, the battery front side portions 48 and the battery brackets 50 are disposed at positions of facing the battery frame portion 44 in the longitudinal direction. Accordingly, the battery frame portion 44 may receive collision load front the front via the battery front side portions 48 and the battery brackets 50, and the impact resistance of the vehicle improves.

In the present exemplary embodiment, the vehicle longitudinal direction rear ends of the front side members 14 and the vehicle longitudinal direction rear ends of the side rails 22 are disposed so as to be offset from one another in the vehicle transverse direction. Accordingly, the places where load is inputted to the battery case 40 are distributed, and damage to the battery case 40 may be suppressed.

Moreover, in the present exemplary embodiment, the rear ends of the side rails 22 are inserted between the supporting portions 52A that are provided at the battery brackets 50. Accordingly, positional offset between the battery brackets 50 and the supporting portions 52A is suppressed, and the transmission of the collision load is carried out efficiently.

In the present exemplary embodiment, the supporting portions 52A support the vehicle transverse direction both side surfaces of the side rails 22, and the side rails 22 and the supporting portions 52A are fastened together by the bolts 60 that are inserted-in from the vehicle transverse direction outer sides. Accordingly, the workability at the time of assembling the side rails 22 and the battery brackets 50 improves.

Moreover, in the present exemplary embodiment, the battery bracket 50 has the transmitting portions 52B, the first reinforcing rib 56A, the second reinforcing rib 56B and the third reinforcing rib 56C. Accordingly, lightening of the weight of, and increasing of the rigidity of, the battery bracket 50 may both be achieved.

In the present exemplary embodiment, the third joining portion 59C that is formed at the battery bracket 50 and the corner portion 44A of the battery frame portion 44 face one another in the vehicle longitudinal direction. Accordingly, the load at the time of a front collision may be dispersed in the vehicle longitudinal direction and the vehicle transverse direction of the battery case 40.

Further, in the present exemplary embodiment, the side rails 22 and the battery case 40 are disposed such that the heights of the respective centroids thereof are aligned in the vertical direction. Accordingly, at the time of a front collision, the centroids of the side rails 22 receive reaction force from the centroid of the battery case 40, and the side rails 22 are axially compressed efficiently.

Second Exemplary Embodiment

Figure 6:
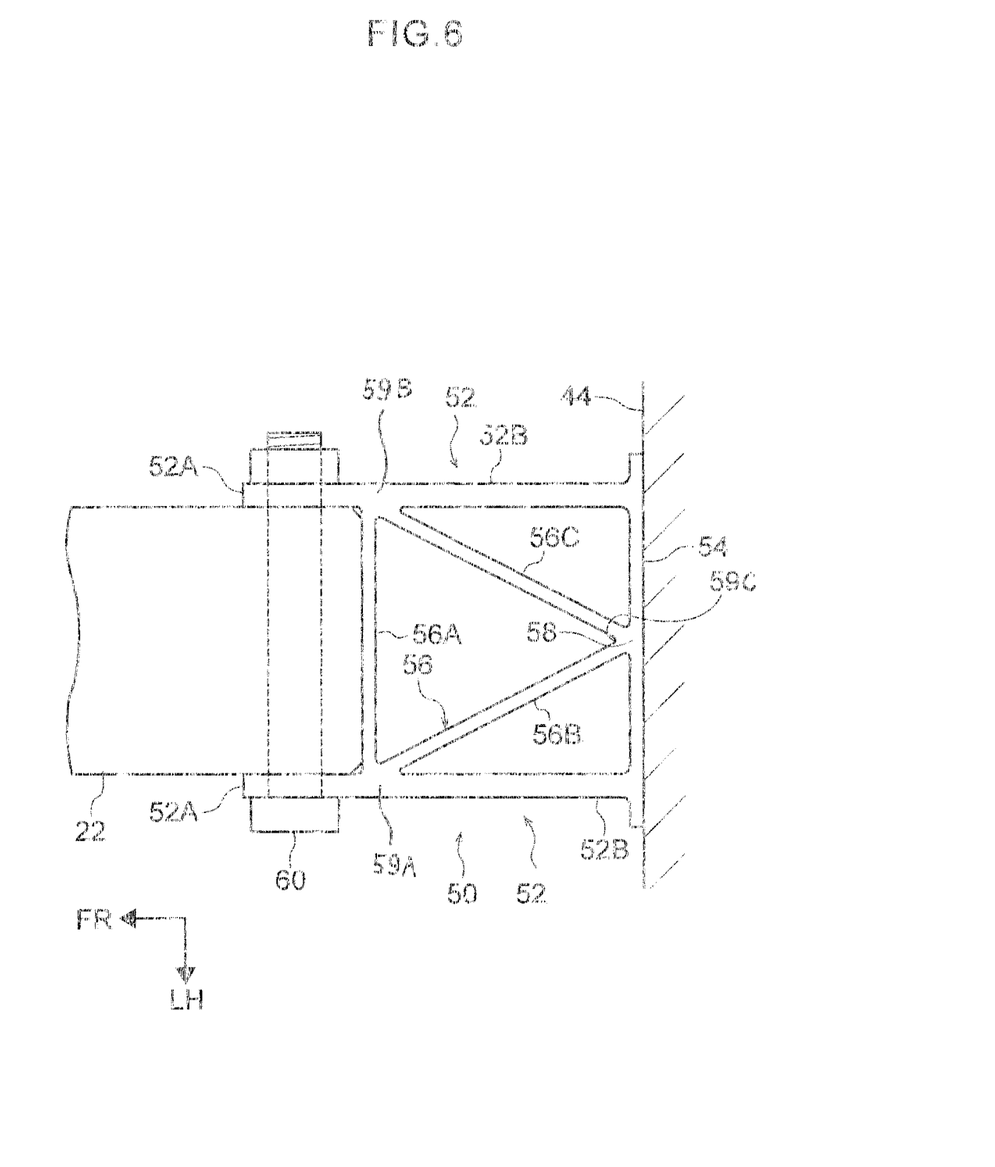
FIG. 6 is a plan view of the periphery of the battery bracket in a vehicle front portion structure of a second exemplary embodiment.

In the first exemplary embodiment, the corner portions 44A-44B are provided at the battery frame portion 44. However, the second exemplary embodiment differs from the first exemplary embodiment with regard to the point that these are not provided. As illustrated in FIG. 6, the rear wall portion 54 of the present exemplary embodiment is a plate-shaped member having a surface that is substantially perpendicular to the vehicle longitudinal direction, and faces the front end surface of battery frame portion 44 in the longitudinal direction.

In the present exemplary embodiment, because the corner portions 44A-44B are provided at the battery frame portion 44, the load capacity of the battery 46 may be ensured, and molding of the battery case 40 and the battery brackets 50 is facilitated.

Note that, in the first exemplary embodiment and the second exemplary embodiment the side rails 22, the lower side members 30 and the battery brackets 50 are formed by aluminum extruded members, and the front cross member 24 and the rear cross member 26 are formed by aluminum die casting. However, other than this, these members may be formed by aluminum cast parts, or steel plates, or the like.

Further, in the first exemplary embodiment and the second exemplary embodiment, as seen in a plan view and in a side view, the entire battery bracket 50 faces the side rail 22 and the battery case 40 in the longitudinal direction, but at least a portion thereof may be offset.

Further, although the vehicle 10 is an electric automobile in the first exemplary embodiment and the second exemplary embodiment, the vehicle 10 may be a hybrid vehicle or the like.

Although exemplary embodiments of the present disclosure have been described above, the present disclosure is not limited to the above, and, of course, may be implemented by being modified in various ways other than the above within a scope that does not depart from the gist thereof.

What is claimed is:

1. A vehicle front portion structure comprising:
a battery case that is installed beneath a floor of a vehicle;
front side members that extend in a vehicle longitudinal direction further toward a vehicle front side than the battery case;
side rails that structure portions of a suspension member that is disposed further toward the vehicle front side than the battery case, and that extend in the vehicle longitudinal direction;
first connecting members that connect the battery case and the front side members; and
second connecting members each having a truss shape, that connect a vehicle longitudinal direction front end portion of the battery case and vehicle longitudinal direction rear ends of the side rails, that face the battery case in the vehicle longitudinal direction as seen in a plan view and in a side view, and that face the side rails in the vehicle longitudinal direction as seen in a plan view and in a side view.

2. The vehicle front portion structure of claim 1, wherein vehicle longitudinal direction rear ends of the front side members and the vehicle longitudinal direction rear ends of the side rails are offset in a vehicle transverse direction.

3. The vehicle front portion structure of claim 1, wherein vehicle longitudinal direction front end portions of the second connecting members each have a pair of supporting portions that extend toward a vehicle front side, and rear end portions of the side rails are supported by the supporting portions.

4. The vehicle front portion structure of claim 3, wherein the supporting portions support vehicle transverse direction side surfaces of the side rails, and the side rails and the supporting portions are fastened by fastening members that are inserted from vehicle transverse direction outer sides.

5. The vehicle front portion structure of claim 3, wherein each of the second connecting members includes:
a pair of transmitting portions that extend in the vehicle longitudinal direction from respective rear ends of the pair of supporting portions;
a rear wall portion that connects rear ends of the pair of transmitting portions in a vehicle transverse direction;
a first rib that connects the pair of transmitting portions at a vehicle longitudinal direction front side of the rear wall portion;
a second rib that connects the rear wall portion and a first joining portion that joins the first rib and one transmitting portion of the pair of transmitting portions; and
a third rib that connects a rear end of the second rib and a second joining portion that joins the first rib and another transmitting portion of the pair of transmitting portions,
wherein a third joining portion, which joins the second rib and the third rib, overlaps with a rear end of a corresponding side rail in a vehicle vertical direction.

6. The vehicle front portion structure of claim 5, wherein the battery case includes corner portions at a vehicle longitudinal direction front end portion as seen in a vehicle plan view, and each third joining portion faces a corresponding corner portion in the vehicle longitudinal direction.

7. The vehicle front portion structure of any one of claim 1, wherein heights of centroids of the side rails in a vehicle vertical direction coincide with a height of a centroid of the battery case in the vehicle vertical direction.

8. A vehicle front portion structure comprising:
a battery case that is installed beneath a floor of a vehicle;
front side members that extend in a vehicle longitudinal direction further toward a vehicle front side than the battery case;
side rails that structure portions of a suspension member that is disposed further toward the vehicle front side than the battery case, and that extend in the vehicle longitudinal direction;
first connecting members that connect the battery case and the front side members; and
second connecting members that connect a vehicle longitudinal direction front end portion of the battery case and vehicle longitudinal direction rear ends of the side rails, that face the battery case in the vehicle longitudinal direction as seen in a plan view and in a side view, and that face the side rails in the vehicle longitudinal direction as seen in a plan view and in a side view,
wherein vehicle longitudinal direction front end portions of the second connecting members each have a pair of supporting portions that extend toward a vehicle front side, and rear end portions of the side rails are supported by the supporting portions,
wherein each of the second connecting members includes:
a pair of transmitting portions that extend in the vehicle longitudinal direction from respective rear ends of the pair of supporting portions;
a rear wall portion that connects rear ends of the pair of transmitting portions in a vehicle transverse direction;
a first rib that connects the pair of transmitting portions at a vehicle longitudinal direction front side of the rear wall portion;
a second rib that connects the rear wall portion and a first joining portion that joins the first rib and one transmitting portion of the pair of transmitting portions; and
a third rib that connects a rear end of the second rib and a second joining portion that joins the first rib and another transmitting portion of the pair of transmitting portions,
wherein a third joining portion, which joins the second rib and the third rib, overlaps with a rear end of a corresponding side rail in a vehicle vertical direction.

9. A vehicle front portion structure comprising:
a battery case that is installed beneath a floor of a vehicle;
front side members that extend in a vehicle longitudinal direction further toward a vehicle front side than the battery case;
side rails that structure portions of a suspension member that is disposed further toward the vehicle front side than the battery case, and that extend in the vehicle longitudinal direction;
first connecting members that connect the battery case and the front side members; and
second connecting members that connect a vehicle longitudinal direction front end portion of the battery case and vehicle longitudinal direction rear ends of the side rails, that face the battery case in the vehicle longitudinal direction as seen in a plan view and in a side view, and that face the side rails in the vehicle longitudinal direction as seen in a plan view and in a side view, wherein heights of centroids of the side rails in a vehicle vertical direction coincide with a height of a centroid of the battery case in the vehicle vertical direction.

* * * * *